United States Patent
Kitajima et al.

(10) Patent No.: US 8,190,036 B2
(45) Date of Patent: May 29, 2012

(54) OPTICAL SIGNAL RECEIVING APPARATUS AND OPTICAL SIGNAL ATTENUATION CONTROLLING METHOD

(75) Inventors: Koshi Kitajima, Kawasaki (JP); Sunao Itou, Kawasaki (JP); Hideyuki Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 457 days.

(21) Appl. No.: 12/385,004

(22) Filed: Mar. 27, 2009

(65) Prior Publication Data

US 2009/0297169 A1    Dec. 3, 2009

(30) Foreign Application Priority Data

Jun. 2, 2008   (JP) .................................. 2008-145071

(51) Int. Cl.
*H04B 10/06* (2006.01)

(52) U.S. Cl. .......................... 398/210; 398/209; 398/208

(58) Field of Classification Search .................. 398/210, 398/209, 208

See application file for complete search history.

(56) References Cited

U.S. PATENT DOCUMENTS

| 7,113,709 B2 * | 9/2006 | Kawasumi ..................... 398/208 |
| 7,430,373 B2 | 9/2008 | Yamashita |
| 2005/0168806 A1 * | 8/2005 | Maeda et al. .............. 359/341.4 |

FOREIGN PATENT DOCUMENTS

| JP | 2000-244417 | 9/2000 |
| JP | 2004-023295 | 1/2004 |
| JP | 2004-297790 | 10/2004 |

* cited by examiner

*Primary Examiner* — Kinam Park
(74) *Attorney, Agent, or Firm* — Staas & Halsey LLP

(57) ABSTRACT

A VOA maximum attenuation control circuit has, in addition to a conventional VOA maximum attenuation control circuit, a first resistor and a second resistor, a transistor which is an emitter follower type PNP transistor, and a capacitor. Since charge of the capacitor is 0 volt at the instant when power of the optical interface unit or each optical interface is shifted from OFF state to ON state, current is supplied to a VOA by the transistor in association with shift to the ON state of the power. As a result, attenuation of the VOA reaches maximum. When the capacitor is gradually charged, base potential of the transistor is finally +5 volts, and current is 0 ampere. Then shifting to maximum attenuation control of the VOA by an operational amplifier is realized.

9 Claims, 10 Drawing Sheets

OPTICAL SIGNAL RECEIVING APPARATUS AND OPTICAL SIGNAL ATTENUATION CONTROLLING METHOD

CROSS-REFERENCE TO RELATED APPLICATION

This application is based upon and claims the benefit of priority of the prior Japanese Patent Application No. 2008-145071, filed on Jun. 2, 2008, the entire contents of which are incorporated herein by reference.

FIELD

The embodiments discussed herein are directed to an optical signal receiving apparatus that controls a variable optical attenuator conducting optical signal attenuation in a wavelength multiplexer and an optical signal attenuation controlling method.

BACKGROUND

In association with dramatically increased importance of computer network communication such as the Internet, higher communication speed is demanded for computer network communication. For example, the Internet has a backbone circuit as a trunk transmission line, and it becomes general to use an optical communication technique of broadband called "Wavelength Division Multiplexing (WDM)" for the backbone circuit.

On the side of WDM circuit of an optical interface device that connects between a WDM circuit and a client circuit, an optical demultiplexing device is disposed. The optical demultiplexing device has a function of multiplexing an optical signal from the client circuit for sending to the WDM circuit, while demultiplexing an optical signal from the WDM circuit for distributing to each optical interface device.

The optical demultiplexing device is provided with an amplifier for amplifying an optical signal in a former stage of executing demultiplexing of optical signal to recover attenuation of the optical signal having reached through the long-distance WDM circuit. The optical signal amplified in this manner is demultiplexed and input into each optical interface device.

However, when the amplified optical signal input into an optical interface device is excessively amplified, a Large Scale Integration (LSI) such as optical module possessed by the optical interface device will be burdened. Excess burden will lead abnormality of electronic parts, and, in the worst case, may result in failure of the optical interface device.

For addressing this, in the conventional art, a variable optical attenuator called Variable Optical Attenuator (VOA) is provided in the foremost stage, and control is made so that a signal level of the optical signal input into the optical interface device is reduced to an appropriate signal level.

Also in the conventional art, in the optical demultiplexing device, the VOA is provided in the later stage of the amplifier for amplifying an optical signal and in a former stage of demultiplexing of optical signal, and control is made to reduce a signal level of optical signal before demultiplexing to an appropriate signal level.

The conventional technology are exemplarily disclosed in Japanese Laid-open Patent Publication No. 2000-244417, Japanese Laid-open Patent Publication No. 2004-23295 and Japanese Laid-open Patent Publication No. 2004-297790

However, the conventional art has the following problems. To be more specific, when a signal level of optical signal increases and output potential of an optical module rises to be a predetermined voltage or higher, a signal level of the optical signal is attenuated by increase of electric current of VOA as a result of rise in base potential of transistor. When the power of the optical interface device is OFF, an electric current is not supplied to the VOA, so that attenuation of signal level of optical signal is 0 dB.

Here, assuming the case where the optical interface device is turned ON in the condition that the signal level of the optical signal is input maximally, the optical signal of the signal level exceeding the maximum reception power of the optical module is input into the optical module until the VOA functions in a steady state. Accordingly, there is a problem that the optical module may be damaged at the time of turning on the power of the optical interface device.

When an optical signal is in input break in the condition that the power is ON, attenuation of signal level of the optical signal by the VOA is 0 dB according to the control logic. Therefore, the optical signal is recovered from input break, and the optical signal is directly input to the optical module. When the signal level of optical signal is a signal level exceeding the maximum receiving power of the optical module, there is a problem that a damage may be exerted on the optical module.

SUMMARY

According to an aspect of the invention, an optical signal receiving apparatus includes a variable optical attenuation control unit, disposed in a former stage of an optical signal receiving unit and executes attenuation control of signal level of input optical signal to the apparatus by a variable attenuation having an upper limit of a predetermined maximum attenuation; and an attenuation control unit that controls the variable optical attenuation control unit so that the variable attenuation is the maximum attenuation at the time of turning on the power of the apparatus or at the time of recovery from input optical signal break of the apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

[a] First Embodiment

First, a first embodiment will be explained. The first embodiment assumes the case that power of an optical interface device or an optical interface unit is turned on in the condition that an optical signal of maximum output is input from the WDM circuit to the optical interface device. In this case, it is intended to suppress output of optical signal of maximum output for preventing electronic parts of the optical interface device from breaking down due to the output of the optical signal of maximum output.

Figure 1:
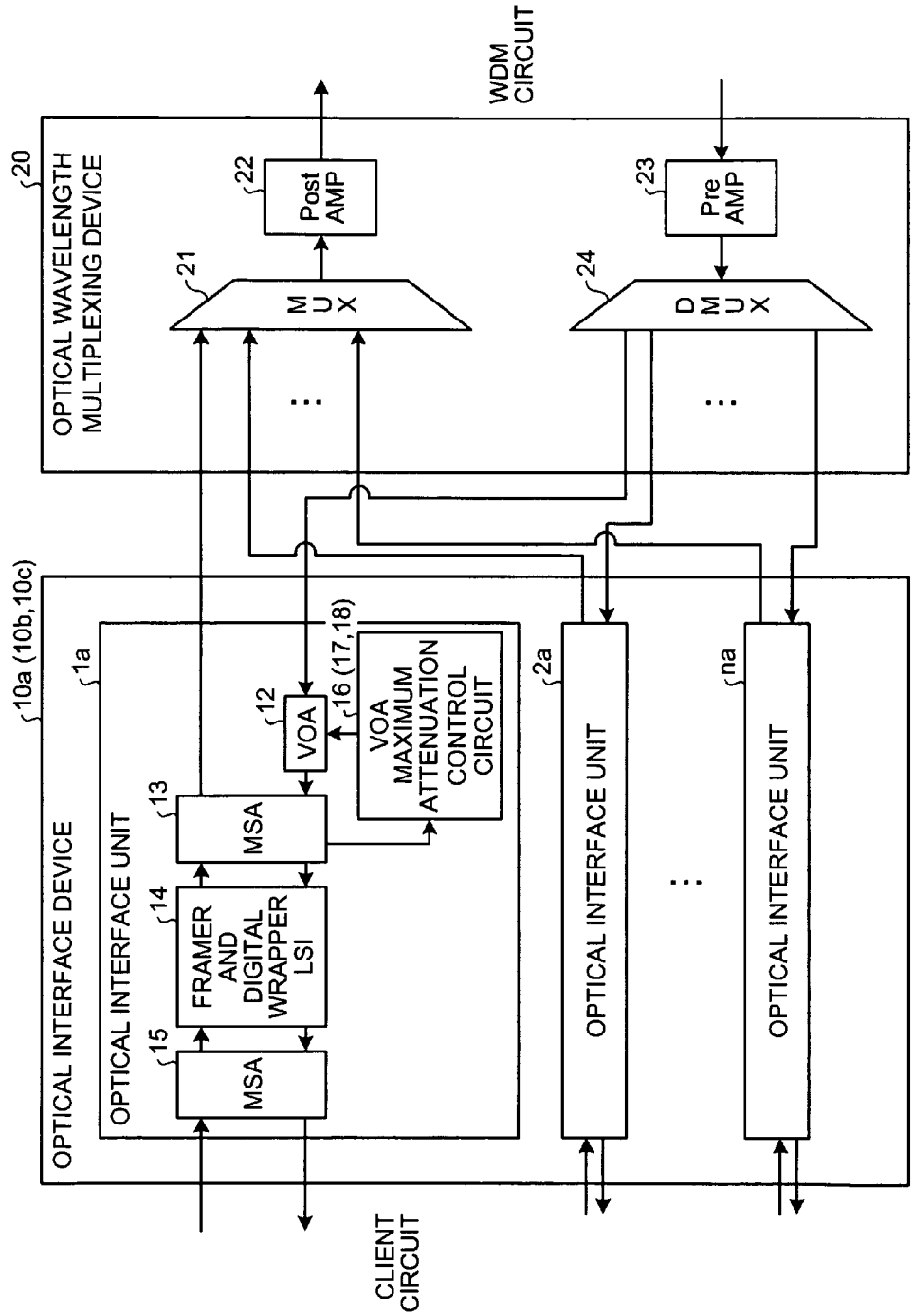
FIG. 1 is a block diagram of a configuration of an optical wavelength multiplexing system according to the first embodiment.

FIG. 1 is a block diagram of a configuration of an optical wavelength multiplexing system according to the first embodiment. The optical wavelength multiplexing system is so configured that an optical interface device 10a is disposed on the side of client circuit, and an optical wavelength demultiplexing device 20 is disposed on the side of WDM circuit.

The optical interface device 10a has n (n is natural number of equal to or larger than one) optical interface units 1a, 2a, ..., na. Since each optical interface unit has identical configuration and function, configuration and function of each optical interface unit will be explained representatively for the optical interface unit 1a.

The optical interface unit 1a has a VOA 12, a Multi Source Agreement (MSA) 13 disposed on the side of the optical wavelength demultiplexing device 20, a Framer and Digital Wrapper LSI 14, a MSA 15 disposed on the side of client circuit, and a VOA maximum attenuation control circuit 16.

The VOA 12 is a variable optical attenuator as same as that in the conventional art. The MSA 13 and the MSA 15 are optical modules in which an Optical signal/Electrical signal (O/E) conversion circuit that converts an optical signal to an electric signal, an E/O conversion circuit that converts an electric signal to an optical signal, a Clock Data Recovery (CDR) that separates between clock and data in a signal in which clock is superimposed on data, and a SERializer/DE-Serializer (SERDES) that conducts mutual conversion between serial signal and parallel signal are integrated.

The Framer and Digital Wrapper LSI 14 processes an input signal from the side of client circuit which is converted into an electric signal to monitor header information of the electric signal, and detects input signal break from the side of the client circuit. Further, the Framer and Digital Wrapper LSI 14 conducts a digital Wrapper (DW) process for adding channel header and Forward Error Correction (FEC) before and after a frame of electric signal, and delivers to the MSA 13.

Further, the Framer and Digital Wrapper LSI 14 processes an input signal from the side of WDM circuit which is converted into an electric signal to monitor header information of the electric signal, and detects input signal break from the side of WDM circuit. Further, the Framer and Digital Wrapper LSI 14 conducts a Decoding-Digital Wrapper (D-DW) process for removing channel header and FEC added before and after frame of electric signal, and delivers to the MSA 15. The details of the VOA maximum attenuation control circuit 16 will be described later with reference to FIG. 2.

The optical wavelength demultiplexing device 20 includes a multiplexer (MUX) 21 that multiplexes an optical signal sent from the client circuit via n optical interface units 1a, 2a, ..., na of the optical interface device 10a. Also the optical wavelength demultiplexing device 20 includes a post amplifier (AMP) 22 that amplifies the optical signal multiplexed by the MUX 21 in a later stage of the MUX 21. The light signal amplified by the Post AMP 22 is sent to the WDM circuit.

The optical wavelength demultiplexing device 20 has a Pre AMP 23 that amplifies an optical signal which is sent from the WDM circuit and is multiplexed, in a former stage of the process by a demultiplexer (DMUX) 24 as will be described later. It also has the DMUX 24 for demultiplexing the optical signal amplified by the Pre AMP 23. The optical signals demultiplexed by the DMUX 24 are respectively input to n optical interface units 1a, 2a, na of the optical interface device 10a.

Figure 2:
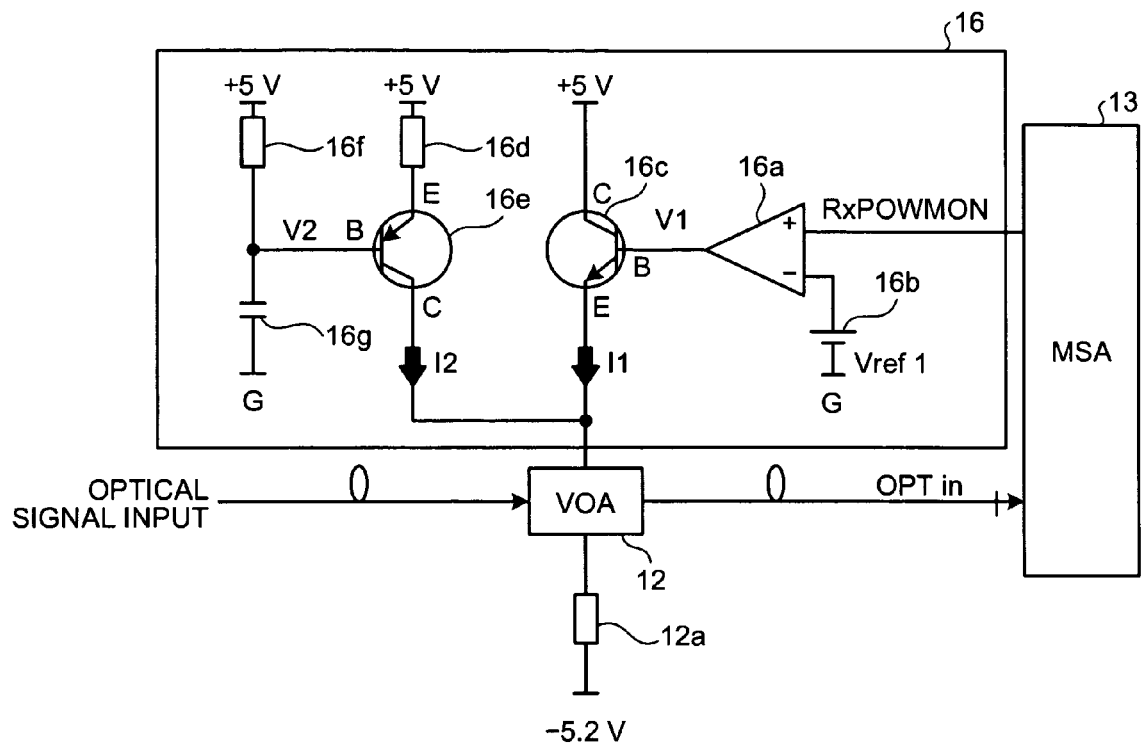
FIG. 2 is a block diagram of a configuration of a VOA maximum attenuation control circuit according to the first embodiment.

Next, a configuration of the VOA maximum attenuation control circuit 16 depicted in FIG. 1 will be explained. FIG. 2 is a block diagram of a configuration of the VOA maximum attenuation control circuit 16 according to the first embodiment. As depicted in the drawing, the VOA maximum attenuation control circuit 16 has an operational amplifier 16a into which RxPOWMON which is potential of electric signal output from the MSA 13 is non-inverting input, and potential from an earth power source 16b having reference voltage of Vref1 is inverting input.

Output of the operational amplifier 16a is input to a base of a transistor 16c which is an emitter follower type NPN transistor. A collector of the transistor 16c is connected to a power source of +5 volts. An emitter of the transistor 16c is connected to the VOA 12.

In the operational amplifier 16a, as OPTin (optical input power 1) depicted in FIG. 2 increases, potential of output of RxPOWMON of the MSA 13 increases to be equal to or higher than reference potential Vref of 1 volt of the operational amplifier 16a. Then potential of the base of the transistor 16c is increased to V1 [volt] and current I1 depicted in FIG. 2 is input to the VOA 12, thereby increases current to the VOA 12. This achieves attenuation of optical signal input from the WDM circuit.

Current for attenuating optical signal input from the WDM circuit is determined by a resistor 12a inside an equivalent circuit of the VOA 12 depicted in FIG. 3 as will be described later. The VOA 12 is connected to a power source of potential of −5.2 volts via the resistor 12a.

Figure 11A:
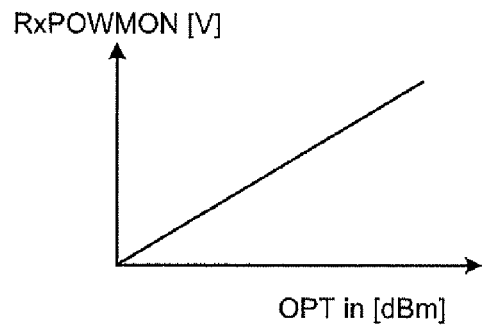
FIG. 11A is a view of relation between OPTin and RxPOWMON by the VOA maximum attenuation control circuit of the conventional art.
Figure 11B:
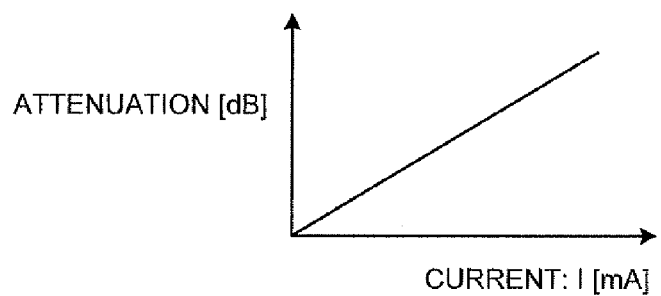
FIG. 11B is a view of feature of VOA by the VOA maximum attenuation control circuit of conventional art.

However, at the instant when the power of the optical interface device 10a or each optical interface is shifted to ON state from OFF state, OPTin is 0 dBm. As depicted in FIG. 11A, output of OPTin [dBm] and RxPOWMON [volt] of the MSA 13 are in direct proportion to each other. As depicted in FIG. 11B, current [mA] input to the VOA 12 and attenuation [dB] of power of optical input signal are in direct proportion to each other.

Figure 9:
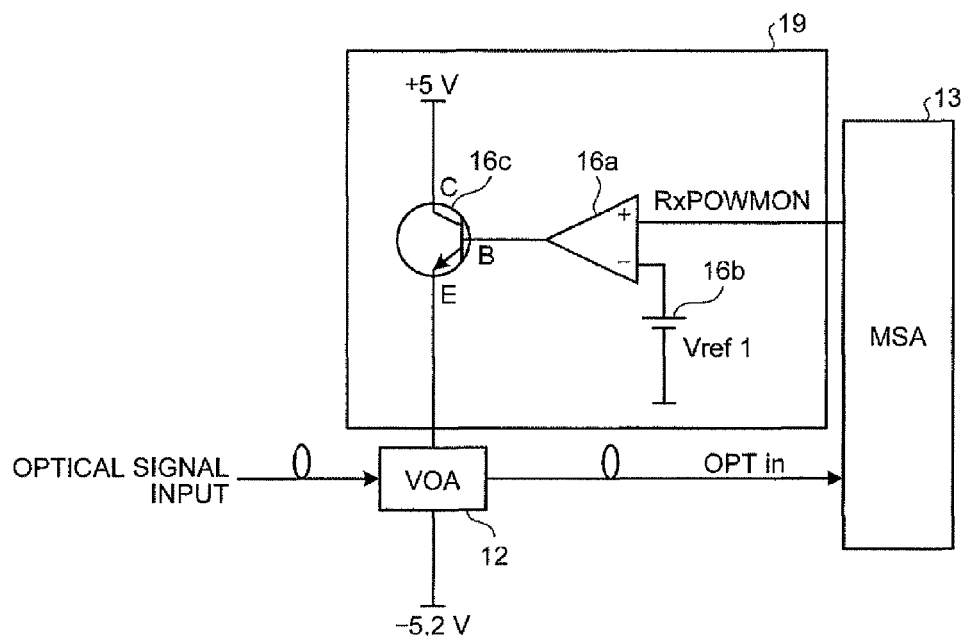
FIG. 9 is a block diagram of a configuration of a VOA maximum attenuation control circuit of a conventional art.
Figure 11C:
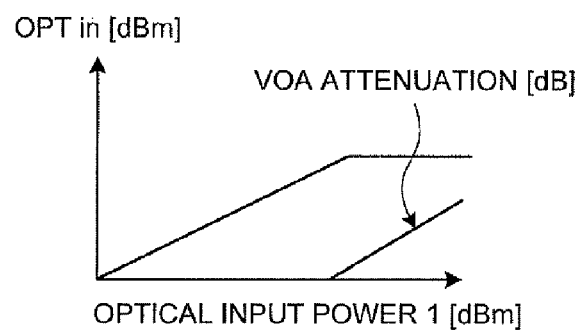
FIG. 11C is a view of relation between optical input power 1 and OPTin by the VOA maximum attenuation control circuit of the conventional art.

Therefore, in the configuration of the VOA maximum attenuation control circuit 19 of the conventional art made up of only the operational amplifier 16a, the earth power source 16b, the transistor 16c as depicted in FIG. 9, it was impossible to attenuate maximum input power of optical signal input from the WDM circuit at the time of turning on the power as depicted in FIG. 11C.

Figure 10A:
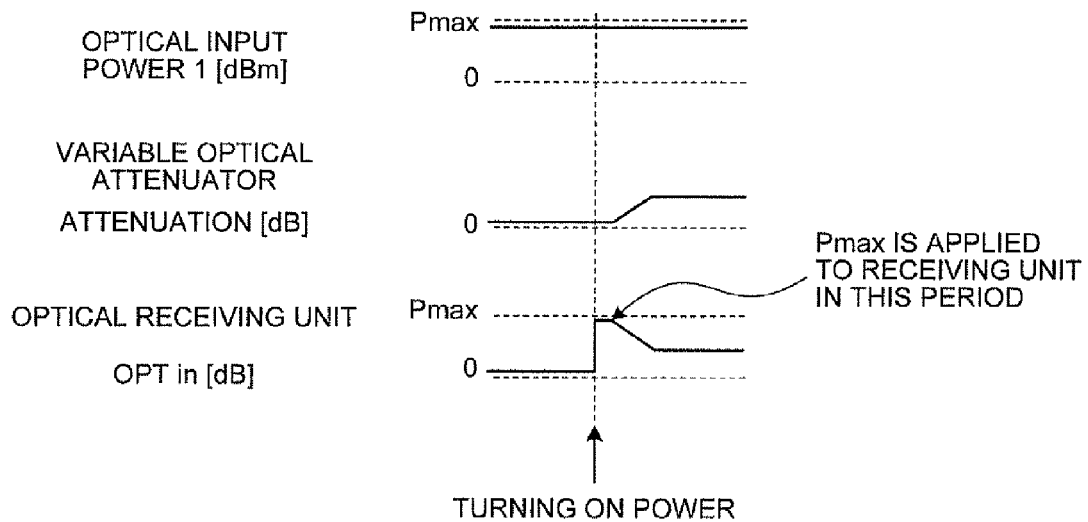
FIG. 10A is a view of operation at the time of turning on the power of the VOA maximum attenuation control circuit of the conventional art.

Therefore, as depicted in FIG. 10A, since OPTin of maximum output is applied on the MSA 13 for a certain period from the instant when the power of the optical interface device 10a or each optical interface is shifted from OFF state to ON state, a damage may be exerted on the MSA 13.

In light of this, the VOA maximum attenuation control circuit 16 according to the first embodiment further has the following configuration. That is, the VOA maximum attenuation control circuit 16 has a resistor 16d and a resistor 16f for dropping potential of power source of +5 volts, a transistor 16e which is an emitter follower type PNP transistor, and a capacitor 16g.

At the instant when the power of the optical interface device 10a or each optical interface is shifted from OFF state to ON state, since charge of the capacitor 16g is 0 volts, the power is shifted to ON state by the transistor 16e, and current I2 as depicted in FIG. 12 is supplied to the VOA 12.

As a result, attenuation of the VOA 12 reaches maximum. As the capacitor 16g is gradually charged, base potential of the transistor 16e finally becomes +5 volts and current I2 becomes 0 ampere. Thereafter, the flow shifts to maximum attenuation control of the VOA 12 by the operational amplifier 16a.

That is, directly after turning on the power, attenuation by current I2 is gradually reduced by gradually increasing base potential of the transistor 16e while controlling attenuation of optical signal input of the VOA 12 to maximum attenuation by making current maximum with base potential of the transistor 16e being 0 volts.

Current I2 should be gradually reduced because OPTin of maximum output will be input into the MSA 13 as a result of rapid OFF before operation of the VOA maximum attenuation control circuit 16. Accordingly, it is necessary for time constant of the resistor 16f and the capacitor 16g to be set slower than response speed of the operational amplifier 16a.

Figure 3:
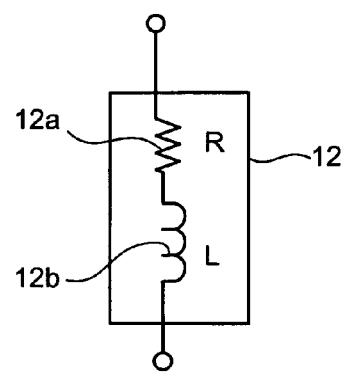
FIG. 3 is a block diagram of a configuration of VOA.

As depicted in FIG. 3, the equivalent circuit for attenuating optical signal input of the VOA 12 is a circuit in which the resistor 12a and a coil 12b are linearly combined. The current supplied to the VOA 12 and applied on the resistor 12a is subjected to voltage drop by the resistor 12a and attenuated by back electromotive force by the coil 12b. The higher the current applied on the resistor 12a, the smaller the influence of the back electromotive force by the coil 12b, so that the larger the current supplied to the VOA 12, the larger attenuation of optical signal input from the side of WDM circuit.

Figure 4:
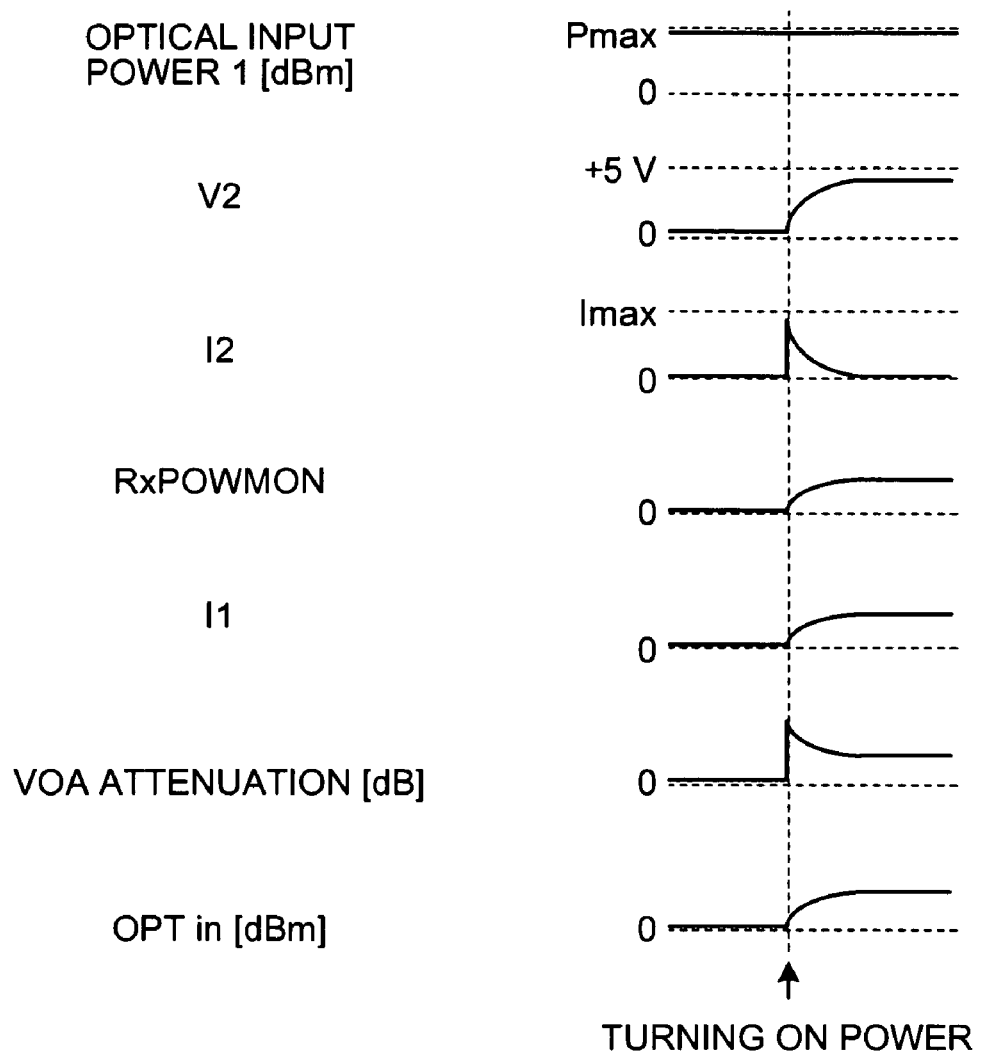
FIG. 4 is a view of VOA attenuation by the VOA maximum attenuation control circuit according to the first embodiment.

Next, VOA attenuation by the VOA maximum attenuation control circuit according to the first embodiment will be explained. FIG. 4 is a view of VOA attenuation by the VOA maximum attenuation control circuit according to the first embodiment.

As depicted in FIG. 4, before and after turning on the power, optical input power 1 dBm is maximum value Pmax. At this time, when the power of the optical interface device or optical interface unit is turned ON (turning on the power), charge is gradually stored in the capacitor 16g depicted in FIG. 2, so that base potential of the transistor 16e indicated by potential V2 depicted in FIG. 2 gradually reaches +5 volts to achieve steady state. On the other hand, with potential V2 changes, current I2 which is collector output of the transistor 16e instantaneously takes maximum at the time of turning on the power, and then gradually decreases.

Potential of output of RxPOWMON of the MSA 13 gradually increases from the point of time of turning on the power. In association with this, output of current I1 which is emitter output of the transistor 16c depicted in FIG. 2 gradually increases.

As depicted in FIG. 4, by inputting current I2 to the VOA 12, VOA attenuation is made maximum, and instantaneous maximum input of optical input power 1 at the time of turning on the power is attenuated to the maximum. After turning on the power, attenuation of optical input power 1 by current I2 gradually decreases. After turning on the power, by gradually inputting current I1 to the VOA 12, gradual shifting to attenuation control of optical input power 1 by current I1 is realized.

According to the first embodiment, since OPTin [dBm] gradually rises from 0 dBm from the point of time of turning on the power, it becomes possible to avoid damage of the MSA 13 by reducing the OPTin [dBm] input power of the MSA 13 from maximum input power.

The first embodiment provides an effect that when power of the optical interface device 10a or the optical interface unit 1a is turned on at the time when optical signal is maximum, it is possible to avoid damage of the MSA 13 due to input of the optical signal (OPTin) of maximum output to the MSA 13.

[b] Second Embodiment

Next, a second embodiment will be explained. The second embodiment assumes the case of recovery from input break of optical signal from the WDM circuit to the optical interface device. In this case, it is intended to suppress output of optical signal of maximum output for preventing electronic parts of the optical interface device from breaking down due to output of optical signal of maximum output.

Figure 5:
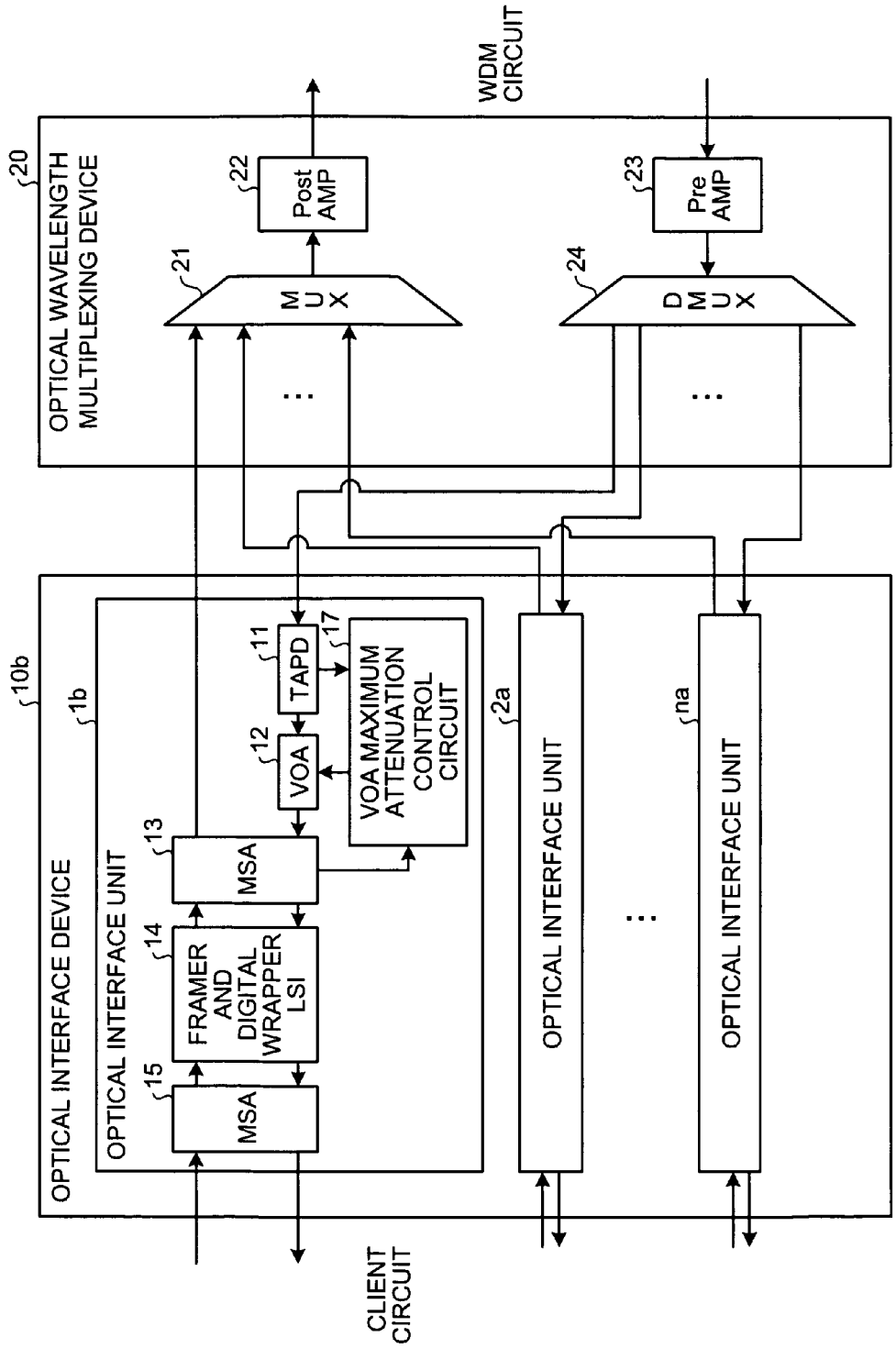
FIG. 5 is a block diagram of a configuration of an optical wavelength multiplexing system according to the second embodiment.

FIG. 5 is a block diagram of a configuration of the optical wavelength multiplexing system according to the second embodiment. In comparison with the optical interface device 10a according to the first embodiment, the optical interface device 10b according to the second embodiment has a VOA maximum attenuation control circuit 17 in place of the VOA maximum attenuation control circuit 16, and has a Top-Absorption Photo Diode (TAPD) 11 in a former stage of the VOA 12. Other configuration is identical to that of the optical interface device 10a according to the first embodiment, and hence explanation thereof will be omitted. Explanation of the TAPD 11 and the VOA maximum attenuation control circuit 17 will be made later with reference to FIG. 6.

In place of the TAPD 11, other element that is able to monitor optical power (monitor input break of optical power and recover from input break) may be used. While the TAPD 11 is arranged outside the VOA maximum attenuation control circuit 17, however, without limited to this arrangement, the TAPD 11 may be arranged inside the VOA maximum attenuation control circuit 17.

The TAPD 11 is a photodiode device that monitors input of optical signal. The TAPD 11 is earthed via a resistor 11a. The TAPD 11 inputs potential V4 of optical signal input to the VOA maximum attenuation control circuit 17.

Figure 6:
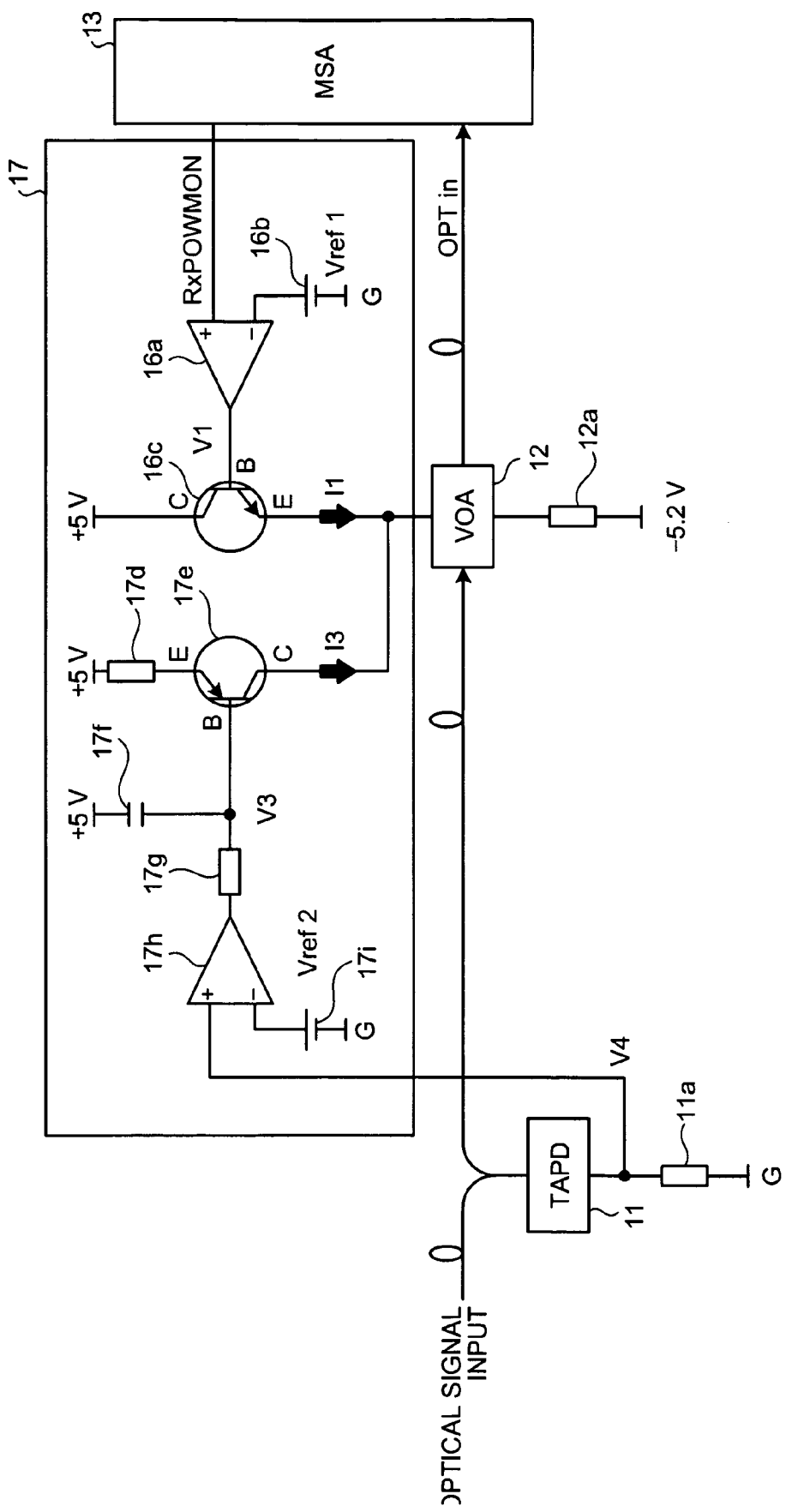
FIG. 6 is a block diagram of a configuration of a VOA maximum attenuation control circuit according to the second embodiment.

As depicted in FIG. 6, the VOA maximum attenuation control circuit 17 includes the operational amplifier 16a, the earth power source 16b, and the transistor 16c. These respectively correspond to and have identical functions as the operational amplifier 16a, the earth power supply 16b, and the transistor 16c of the VOA maximum attenuation control circuit 16 of the first embodiment depicted in FIG. 2.

Figure 10B:
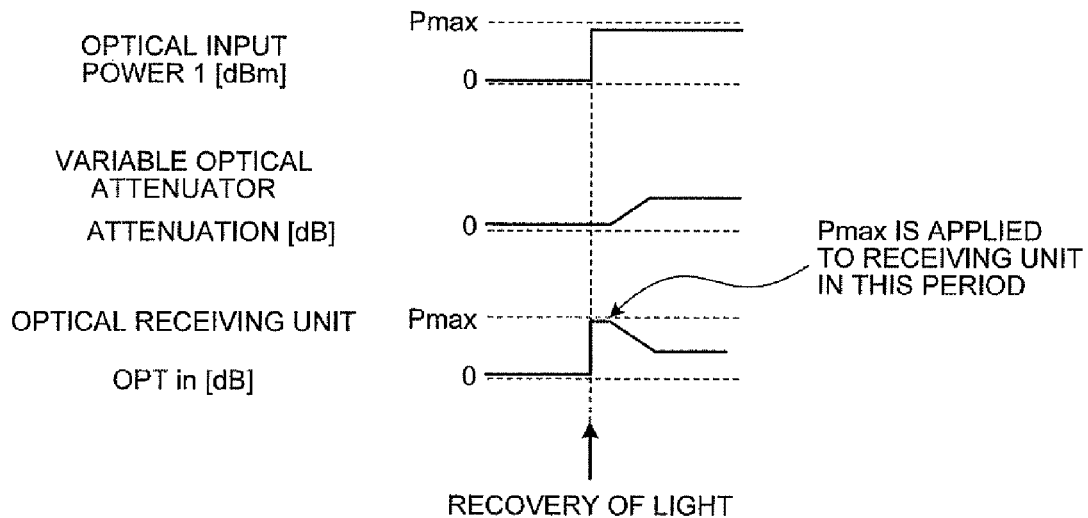
FIG. 10B is a view of operation at the time of recovering from optical input break of the VOA maximum attenuation control circuit of the conventional art.

However, when there is no optical input in the condition that the power of the optical interface device 10a or each optical interface is turned ON, attenuation of the VOA 12 is 0 dB according to the control logic. Therefore, as depicted in FIG. 10B, upon input of optical signal, maximum optical input power 1 is directly applied on the MSA 13 for a certain period and OPTin of maximum output is applied on the MSA 13, so that damage may be exerted on the MSA 13.

In light of this, the VOA maximum attenuation control circuit 17 according to the second embodiment further has the following configuration. That is, the VOA maximum attenuation control circuit 17 includes a resistor 17d provided for voltage drop of potential of the power supply of +5 volts, a transistor 17e which is an emitter follower type PNP transistor, a capacitor 17f, an operational amplifier 17h into which potential V4 volts from the TAPD 11 is non-inverting input, and potential from an earth power source 17i is inverting input, and a resistor 17g provided directly after the operational amplifier 17h.

When there is no optical input in the condition that power source is started, output of the TAPD 11 is 0 ampere, and potential V3 depicted in FIG. 6 is decreased, and collector current I3 of the transistor 17e is increased. Therefore, the VOA 12 standbys in the condition that attenuation is large. At this time, when optical signal input recovers from input break, potential V4 depicted in FIG. 6 increases, and current I3 no longer flows when potential V4 reaches a certain threshold or higher. For the same reason as the case of turning on the power, it is important to give time constant to potential V3 and allow gradual reduction so that rapid OFF of current I3 will not occur. It is necessary for potential V4 depicted in FIG. 6 to be a value exceeding Vref2.

Figure 7:
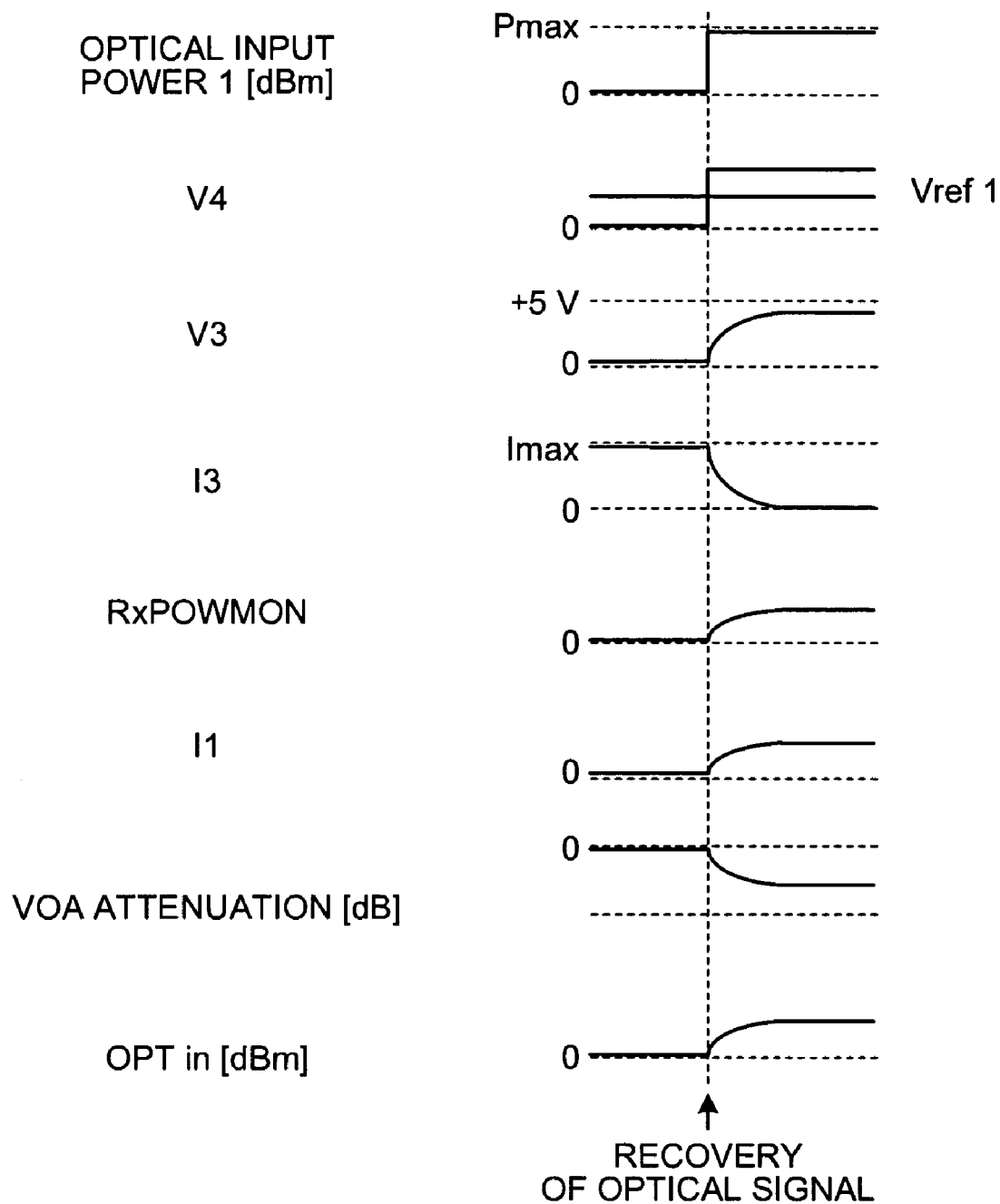
FIG. 7 is a view of VOA attenuation by the VOA maximum attenuation control circuit according to the second embodiment.

Next, VOA attenuation by the VOA maximum attenuation control circuit according to the second embodiment will be explained. FIG. 7 is a view depicting VOA attenuation by the VOA maximum attenuation control circuit according to the second embodiment.

As depicted in FIG. 7, in the condition that the power of the optical interface device or optical interface unit is turned ON, at the instant of rising to Pmax of optical input power 1 [dBm], output potential V4 of the TAPD 11 rises to a value exceeding Vref2.

Since the capacitor 17f depicted in FIG. 6 is gradually charged, base potential of the transistor 17e shown by potential V3 depicted in FIG. 6 gradually reaches +5 volts to enter steady state. On the other hand, in association with change in potential V3, current I3 which is collector output of the transistor 17e instantly takes maximum at the time of turning on the power, and then gradually decreases.

Potential of output of RxPOWMON of the MSA 13 gradually increases from the point of time of turning on the power. In association with this, output of current I1 which is emitter output of the transistor 16c depicted in FIG. 6 also gradually increases.

As depicted in FIG. 6, by inputting I3 to the VOA 12 to make VOA attenuation be maximum, instant maximum input of optical input power 1 at the time of recovery from optical input break is attenuated maximally. And after recovery from optical input break, attenuation of the optical input power 1 by I3 gradually decreases. After recovery from optical input break, by gradually inputting I1 to the VOA 12, gradual shifting to attenuation control of the optical input power 1 by I1 is realized.

According to the second embodiment, since OPTin [dBm] gradually rises from 0 dBm from the point of time of recovery from optical input break, it is possible to avoid damage of the MSA 13 by reducing OPTin [dBm] input power to the MSA 13 from maximum input power.

The second embodiment above provides an effect that damage of the MSA 13 due to input of the optical signal (OPTin) of maximum output to the MSA 13 can be avoided at the time of recovery from optical signal break in the condition that the power of the optical interface device 10b or the optical interface unit 1b is turned on.

[c] Third Embodiment

The configuration and function for reducing OPTin [dBm] input power to the MSA 13 from the maximum input power at the time of turning on the power, and the configuration and function of reducing OPTin [dBm] input power to the MSA 13 from the maximum input power at the time of recovery from optical input break are independent from each other.

Figure 8:
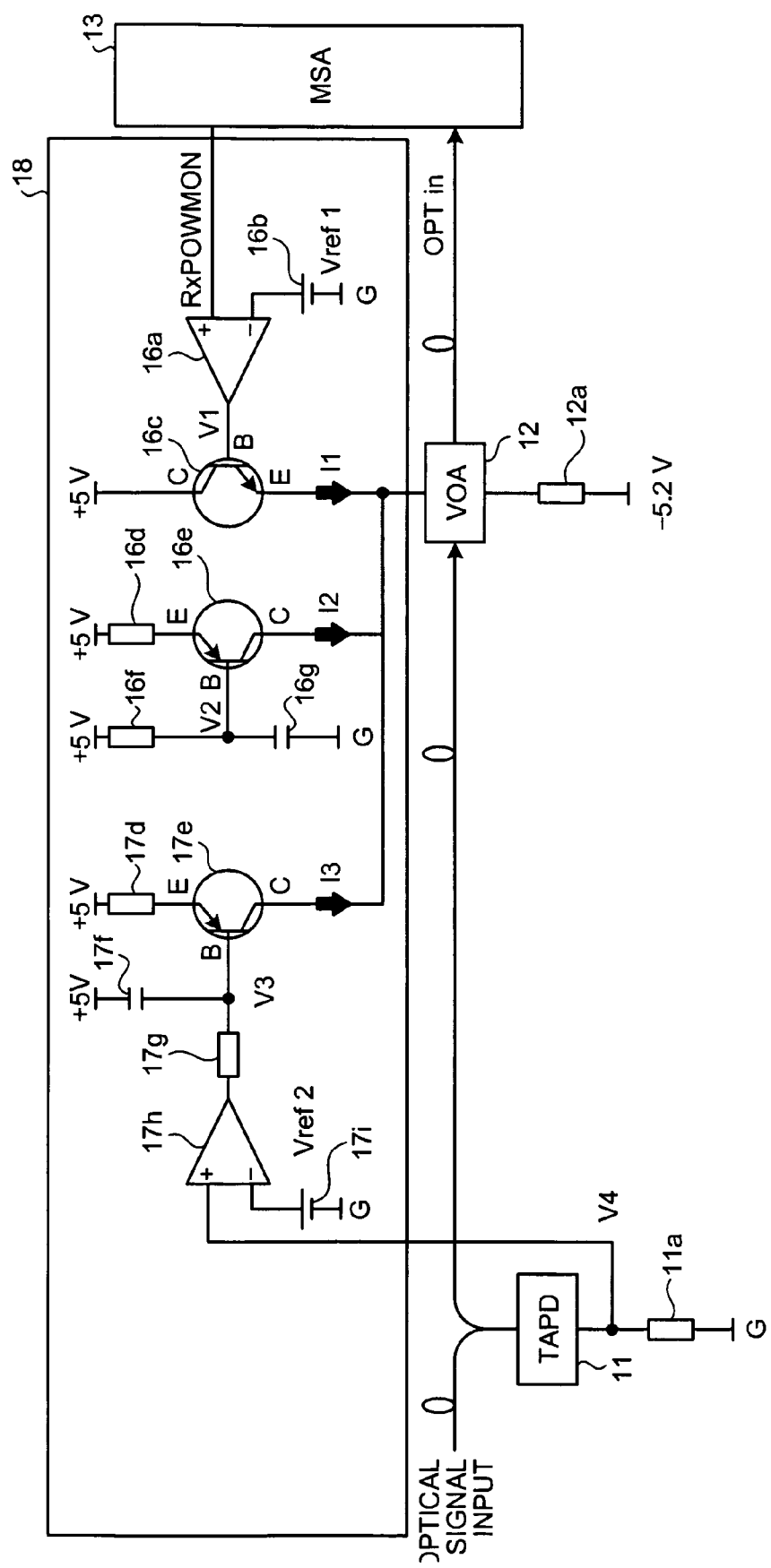
FIG. 8 is a block diagram of a configuration of a VOA maximum attenuation control circuit according to the third embodiment.

Therefore, as depicted in FIG. 8, when the configuration according to the first embodiment and the configuration according to the second embodiment are arranged in the same circuit and connected each other, a VOA maximum attenuation control circuit 18 according to a third embodiment can be configured.

The VOA maximum attenuation control circuit 18 is so configured that OPTin [dBm] gradually rises from 0 dBm from the point of time of turning on the power and point of time of recovery from optical input break. Therefore, in any case, OPTin [dBm] input power to the MSA 13 is reduced from the maximum input power, so that it is possible to avoid damage on the MSA 13.

According to the third embodiment, in the case where power of the optical interface device 10c or the optical interface unit 1c is turned on when optical signal is maximum, or in the case where optical signal break is recovered in the condition that the power of the optical interface device 10c or the optical interface unit 1c is turned on, it is possible to avoid damage on the MSA 13 due to input of optical signal (OPTin) of the maximum output to the MSA 13.

While examples of embodiments have been explained, the present invention is not limited to these, and may be practiced in various different embodiments without departing from the technical idea described in the claims. Also, effects described in these embodiments are not intended to be limitative.

Also, each constituent of each depicted apparatus is given in a functionally conceptual manner, and is not necessarily configured physically as depicted in the drawing. In other words, concrete forms of distribution and integration of each apparatus are not limited to those depicted in the drawings, and whole or part of them may be distributed or integrated functionally or physically in arbitrary unit depending on various load or use situation.

The disclosed optical signal receiving apparatus, optical signal attenuation controlling method and optical signal attenuation control circuit provide an effect that when the power of the optical signal receiving apparatus is turned on in the condition that the optical signal is maximum, or when the optical signal is recovered from break in the condition that the optical signal receiving apparatus is turned ON, it is possible to avoid damage on the integrated circuit such as the optical module of the optical signal receiving apparatus caused by input of the optical signal of maximum output to the optical signal receiving apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical signal receiving apparatus, comprising:
   a variable optical attenuation controller, disposed in a former stage of an optical signal receiving unit and executes attenuation control of signal level of input optical signal to the apparatus by a variable attenuation having an upper limit of a predetermined maximum attenuation; and
   an attenuation controller that includes
      a first PNP transistor,
      an emitter earth type current source connected with an emitter of the first PNP transistor, and
      a capacitor arranged between a base of the first PNP transistor and earth and a resistor arranged between the base of the first PNP transistor and a positive electrode power source,
   the attenuation controller controlling the variable optical attenuation controller so that the variable attenuation is the maximum attenuation at a time of turning on the power of the apparatus or at a time of recovery from input optical signal break of the apparatus.

2. The optical signal receiving apparatus according to claim 1, wherein when the input optical signal is input to the optical signal receiving unit after turning on the power of the apparatus or after recovery from optical signal input break of the apparatus, the attenuation controller successively reduces the variable attenuation from the maximum attenuation, to realize shift control to the variable attenuation based on the input optical signal.

3. The optical signal receiving apparatus according to claim 2, further comprising an optical signal input monitoring unit that monitors optical signal input to the apparatus, wherein
   when recovery from optical signal input break of the apparatus is detected by the optical signal input monitoring unit, the attenuation controller successively reduces the variable attenuation from the maximum attenuation, to realize shift control to the variable attenuation based on the input optical signal.

4. The optical signal receiving apparatus according to claim 2, wherein the attenuation controller includes:
   a second PNP transistor;
   an emitter earth type current source connected with an emitter of the second PNP transistor;
   a base resistor connected with a base of the second PNP transistor;
   a base earth type power source connected with the base of the second PNP transistor;
   a capacitor arranged between the base of the second PNP transistor and the base earth type power source; and
   an amplifier that amplifies an input optical signal monitored by the optical signal input monitoring unit and inputs to the base of the second PNP transistor via the base resistor of the second PNP transistor.

5. The optical signal receiving apparatus according to claim 1, wherein the attenuation controller includes:
   a second PNP transistor;
   an emitter earth type current source connected with an emitter of the second PNP transistor;
   a base resistor connected with a base of the second PNP transistor;
   a base earth type power source connected with the base of the second PNP transistor;
   a capacitor arranged between the base of the second PNP transistor and the base earth type power source; and
   an amplifier that amplifies an input optical signal monitored by the optical signal input monitoring unit and inputs to the base of the second PNP transistor via the base resistor of the second PNP transistor.

6. An optical signal attenuation control circuit apparatus, comprising:
   a variable optical attenuation controller, disposed in a former stage of an optical signal receiving unit and executes attenuation control of signal level of input optical signal to the apparatus by a variable attenuation having an upper limit of a predetermined maximum attenuation; and
   an attenuation controller that includes
      a first PNP transistor,
      an emitter earth type current source connected with an emitter of the first PNP transistor, and
      a capacitor arranged between a base of the first PNP transistor and earth,
      a resistor arranged between the base of the first PNP transistor and a positive electrode power source,
   the attenuation controller controlling the variable optical attenuation controller so that the variable attenuation is the maximum attenuation at a time of turning on the power of the apparatus or at a time of recovery from input optical signal break of the apparatus.

7. The optical signal attenuation control circuit according to claim 6, wherein when the input optical signal is input to the optical signal receiving unit after turning on the power of the apparatus or after recovery from optical signal input break of the apparatus, the attenuation controller successively reduces the variable attenuation from the maximum attenuation, to realize shift control to the variable attenuation based on the input optical signal.

8. The optical signal attenuation control circuit according to claim 7, further comprising an optical signal input monitoring unit that monitors optical signal input to the apparatus, wherein
   when recovery from optical signal input break of the apparatus is detected by the optical signal input monitoring unit, the attenuation controller successively reduces the variable attenuation from the maximum attenuation, to realize shift control to the variable attenuation based on the input optical signal.

9. The optical signal attenuation control circuit according to claim 6, wherein the attenuation controller includes:
   a second PNP transistor;
   an emitter earth type current source connected with an emitter of the second PNP transistor;
   a base resistor connected with a base of the second PNP transistor;
   a base earth type power source connected with the base of the second PNP transistor;
   a capacitor arranged between the base of the second PNP transistor and the base earth type power source; and
an amplifier that amplifies an input optical signal monitored by the optical signal input monitoring unit and inputs to the base of the second PNP transistor via the base resistor.

* * * * *